Oct. 16, 1962  J. V. GIANUKOS  3,058,574
AUTOMATIC BELT TRAINING RETURN ROLLER ASSEMBLY
FOR FLEXIBLE STRAND CONVEYORS
Filed Oct. 8, 1959  3 Sheets-Sheet 1

INVENTOR.
James V. Gianukos,
BY Parker & Carter
Attorneys.

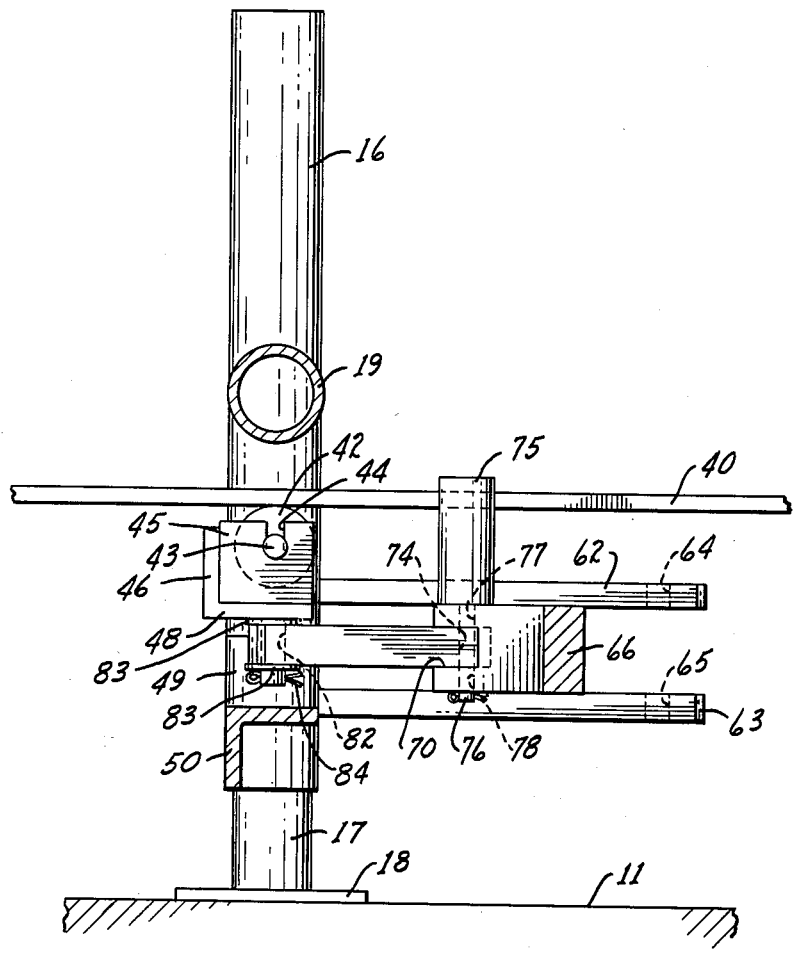

Oct. 16, 1962 J. V. GIANUKOS 3,058,574
AUTOMATIC BELT TRAINING RETURN ROLLER ASSEMBLY
FOR FLEXIBLE STRAND CONVEYORS
Filed Oct. 8, 1959 3 Sheets-Sheet 3

INVENTOR.
James V. Gianukos,
BY Parker & Carter
Attorneys.

United States Patent Office 3,058,574
Patented Oct. 16, 1962

3,058,574
AUTOMATIC BELT TRAINING RETURN ROLLER ASSEMBLY FOR FLEXIBLE STRAND CONVEYORS
James V. Gianukos, Chicago, Ill., assignor to Goodman Manufacturing Company, Chicago, Ill., a corporation of Illinois
Filed Oct. 8, 1959, Ser. No. 845,253
5 Claims. (Cl. 198—202)

This invention relates to flexible belt conveyors and particularly to an automatic belt training return roller assembly which is extremely responsive to passage of the belt thereover in a detrained condition.

Flexible belt conveyors of both the rigid and flexible side frame construction have been in commercial use for some time. These conveyors generally include a plurality of belt supporting structures positioned at intervals along a conveying course, such as a mine run or the like. The belt supporting structures are generally disposed at two continuous elevations, the upper level carrying the conveying reach and the lower level the return reach of the belt. The conveying reach supporting structure causes the belt to form a trough for the carried material, but the return reach of the belt is generally flat since it carries no load.

The belt supporting structures or assemblies, which are generally designated as conveying roller assemblies and return roller assemblies, may be positioned vertically one above the other, or staggered one from the other along the conveying run. Generally the return roller assemblies are located at greater intervals than the conveying roller assemblies since they support no load other than the weight of the empty belt.

The problem of belt training is present in any flexible belt conveyor system, whether it be of the rigid or flexible side frame construction. A typical rigid side frame conveyor is illustrated in Thomson Patent No. 2,561,641 and a flexible side frame conveyor is illustrated in the Craggs et al. Patent No. 2,773,257.

A centering, or training, of a belt as it passes over a roller results from the friction forces between the roller and under surface of the belt. In general, the training effect is exerted in a direction generally perpendicular to the longitudinal axis of the roller. If the roller is perpendicular to the direction of belt travel, the training effect will be directed parallel to the direction of belt travel and the belt will remain centered on the roller. If the angle between the roller and direction of belt travel varies from the perpendicular, the training effect wil urge the belt to one side, or into a detrained position. Detraining of the roller is undesirable because destructive stresses and strains are set up in the system, and the power consumption needed to run the conveyor increases appreciably without any increase in carrying capacity or efficiency.

Accordingly, a primary object of this invention is to provide an automatic training roller assembly for a flexible belt conveyor which is quickly responsive to movement of the belt thereacross in a detrained condition to thereby urge the belt into a trained position.

Another object is to provide a return roller assembly which is freely supported for swinging movement of its ends to and fro in a direction substantially parallel to the direction of belt travel whereby detraining of the belt can be overcome by automatically canting the return roller in a training direction in response to movement of the belt over the roller.

Another object is to provide a return roller assembly utilizing a mechanical linkage system which provides great freedom of movement of the ends of the roller assembly and greatly increases the range of movement of the return roller without significantly increasing the width of the conveyor.

Yet a further object is to provide a double link mechanical linkage adapted for connection to an anchoring structure and to the end portions of a return roller assembly which exerts a stabilizing effect on the belt.

Other objects and advantages of the invention will become apparent throughout the course of the following description.

The invention is illustrated more or less diagrammatically in the accompanying drawings, wherein:

FIGURE 3 is a detailed sectional view to an enlarged scale taken substantially along the lines 3—3 of FIGURE 2 with parts omitted for clarity illustrating the mechanical linkage;

Like reference numerals will be used to refer to like parts throughout the following specification.

Figure 1:
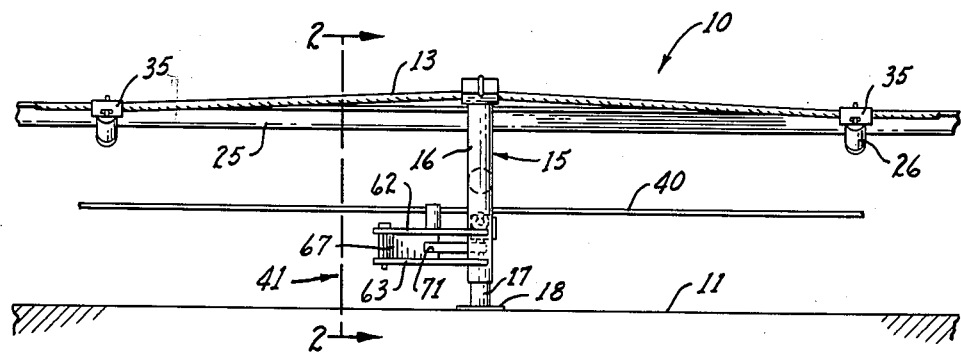
FIGURE 1 is a side elevation of a portion of a flexible conveyor assembly.

A portion of a flexible strand conveyor of the general type illustrated in the Craggs et al. patent is illustrated at 10 in FIGURE 1 as resting on the floor 11 of a mine run or the like. The conveyor includes a pair of flexible strands 12 and 13, shown best in FIGURES 1 and 2, supported at intervals by pairs of oppositely disposed support stands 14 and 15 which rest on the floor 11. The stands, in this instance, are shown as composed of a pair of telescoping members 16 and 17 respectively, each of the inner members 17 being welded to a foot 18 resting on the floor 11. A rigid cross brace or strut 19 maintains the stands a fixed distance apart, and any suitable adjusting means, not shown, may be utilized to maintain the upper ends of the stands in a common horizontal plane when the level of floor 11 varies. Clamp assemblies 20 (which consist in this instance of strand receiving members 21, the inner end of which is bent into a reverse curve to form a strand seat 22, outer bracket members 23 and tightening eye bolts 24), are welded to the top of the support stands. The flexible strands are received in the seats 22 formed in the strand receiving members 21 and forced into snug engagement therewith by tightening the eye bolts 24.

Figure 2:
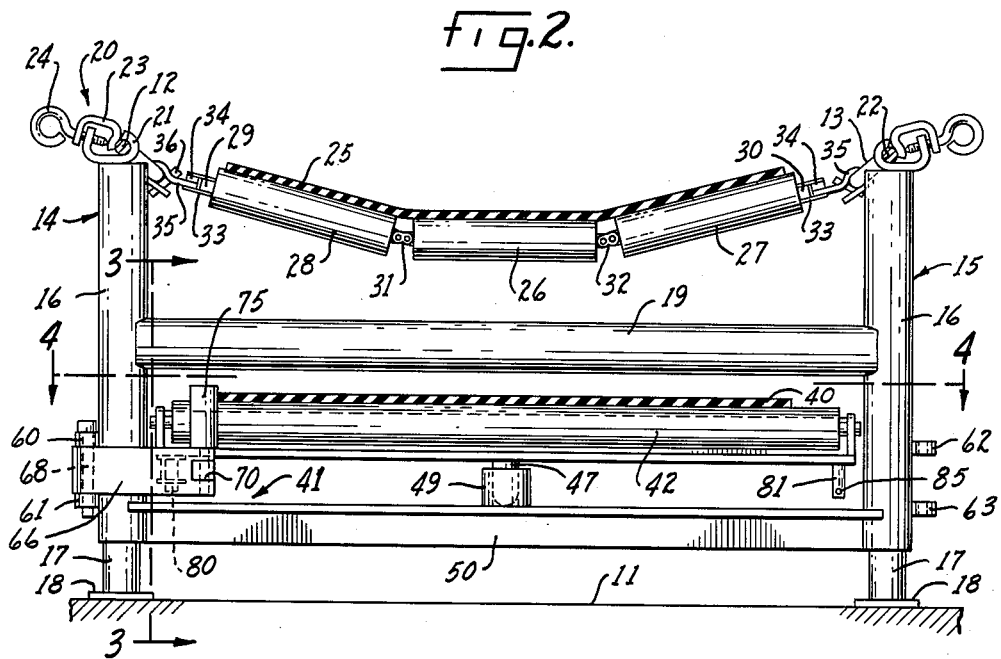
FIGURE 2 is a section taken substantially along the line 2—2 of FIGURE 1.

A plurality of conveying idler assemblies are hung from the flexible strands to form a bed for the conveying reach 25 of a flexible conveyor belt. The troughing idler assembly, in this instance, is shown in FIGURE 2 as including a center, primary load carrying roller 26 flanked by end or wing rollers 27 and 28. The wing roller shafts 29 and 30 are connected to the center roller shaft, not numbered, by links 31 and 32. The outer ends of the wing roller shafts are connected by links 33, similar to links 29 and 30, and spacers 34 to strand hooks 35. Drift pins or other suitable wedge means 36 force the flexible strands into snug engagement in the bights of the connecting hooks. Although a conveying idler assembly similar to that illustrated in the Craggs, et al. patent has been illustrated and described, other arrangements may be utilized.

The return reach 40 of the belt is carried by a return roller assembly indicated generally at 41. The assembly includes a return roller 42 whose shaft 43 is received in slots 44, shown best in FIGURE 3, of end plates 45. The plates 45 are welded to the ends of L-channel 46 to thereby form an elongated rectangular box open on two sides which supports the return roller. A stub shaft 47 projecting downwardly from the approximate center of the lower leg 48 of L-channel 46 is received in a bearing socket 49 which projects upwardly from a second L-channel 50 welded to the outer telescopic members 16, 16, as best seen in FIGURE 1. The shaft 47 is loosely received in socket 49 to provide easy swivelability of the entire return roller assembly. The stub shaft, bearing socket and lower channel 50 support substantially the entire weight of the return roller 42 and its supporting structure.

Substantially instant response of the return roller 42 to movement of the belt thereacross in a detrained condition is provided by the mechanical linkage assembly illustrated best in FIGURES 1, 3, 4 and 5.

Figure 4:
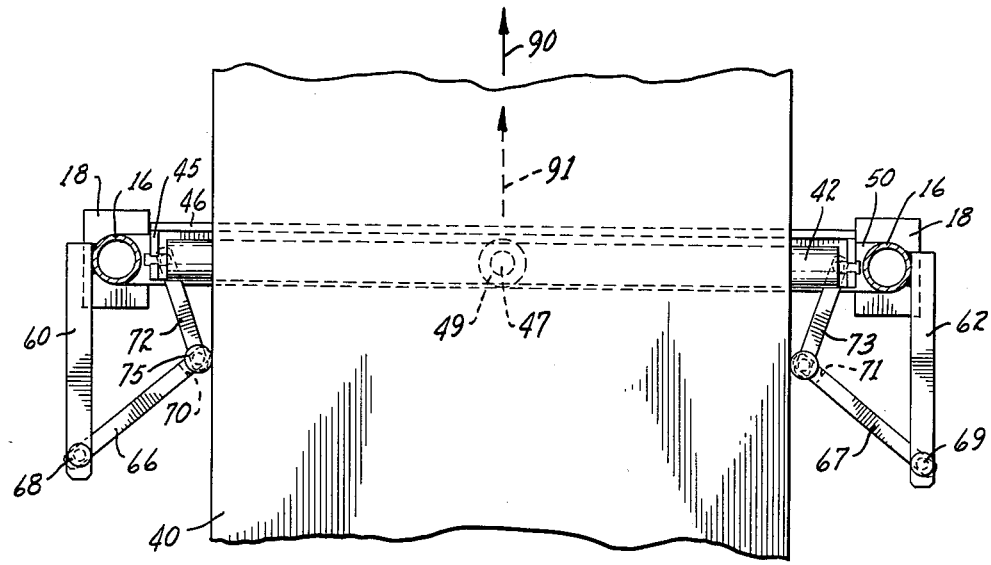
FIGURE 4 is a top view taken substantially along the line 4—4 of FIGURE 2 with parts omitted illustrating the position the return reach of the belt takes when properly trained.
Figure 5:
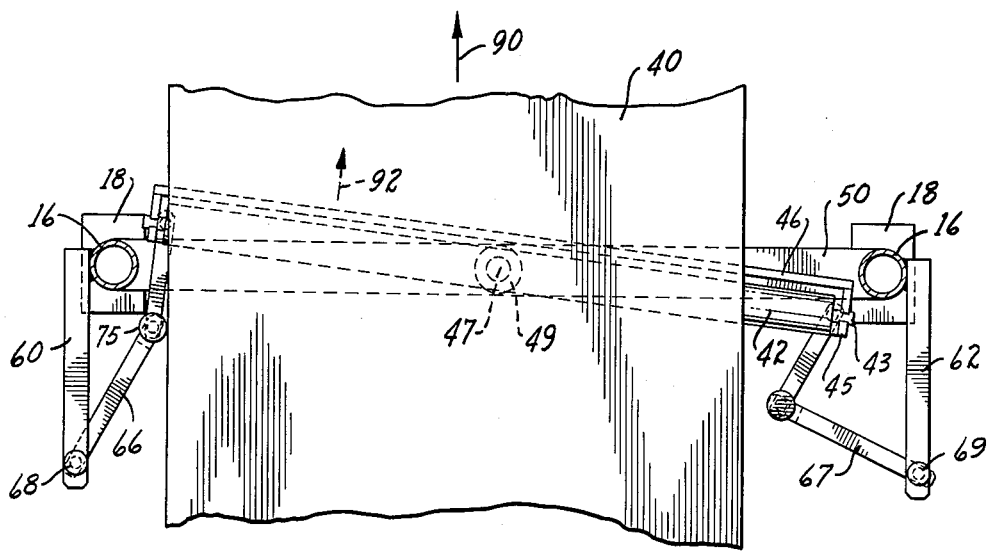
FIGURE 5 is a top plan view similar to FIGURE 4 illustrating the position of the return reach of the belt in a detrained condition.

Pairs of anchor arms 60, 61 and 62, 63, best seen in FIGURES 4 and 5, are welded adjacent their leading ends to the outer members 16 of the support stands, and extend rearwardly in generally vertically aligned relationship. The trailing ends of the arms are provided with aligned apertures 64, 65, best seen in FIGURE 3. A pair of long link arms 66, 67, are pivotally connected to the trailing ends of the anchor arms 60, 61 and 62, 63, by pivot pins 68, 69, respectively. The inner ends of long link arms 66, 67 are slotted as at 70, 71 to receive short link arms 72, 73. The trailing edges of the short link arms are apertured as at 74. A pair of belt edge guide rollers 75, 75 rest on the upper surface of the long links and terminate in shanks 76 which pass through long link apertures 77, 78 which are aligned with aperture 74 in the short link arms. In this instance the guide rollers and their shanks, which in effect are pivot pins, have been integrally formed, but other constructions could be just as feasibly employed.

A pair of connecting pins 80, 81 project downwardly from the ends of L-channel 46 and pass through apertures 82 and the leading ends of the short links 72, 73. Suitable spacers or washers 83 maintain the parts in horizontal alignment and cotter pins 84 passing through holes 85 maintain the parts properly positioned.

The use and operation of the invention can best be described by reference to FIGURES 4 and 5. In each of these figures, the direction of belt travel is indicated by the solid arrow 90 and the direction in which the training effect exerted by roller 42 on the under surface of the belt 40 is indicated by the phantom arrows 91 and 92.

In FIGURE 4, belt 40 is shown as passing over the return roller 42 in a centered condition, and the training effect 91 is exerted in a direction parallel to the direction of belt travel 90 as clearly illustrated by the arrows. In this condition, the guide rollers 75, 75 bear against the edges of the belt and exert a further stabilizing effect by creating a small initial resistance to small belt deviations inherent in any conveyor system.

In FIGURE 5, belt 40 is shown detrained to the left along roller 42. The left edge of the belt substantially overlies or even passes a little beyond the extremet left edge of the roller, whereas a substantial portion of the right end of the roller is exposed.

For convenience sake, the net training effect 91 in FIGURE 4 has been illustrated as a single vector acting through the midpoint of the line of belt-roller contact. Actually, the training effect is exerted by the roller on the belt at all points along the line of contact. When the belt veers to one side, as illustrated in FIGURE 5, the sum of the training forces tending to rotate roller 42 counterclockwise about stub shaft 47 will be greater than the training effect which tends to rotate the roller clockwise. The net imbalance of forces, which is represented by the length of vector 92 as contrasted to vector 91, causes the left end of the return roller to move forwardly thus moving the right end rearwardly. The same end result would occur if the belt were free to change direction and the return roller assembly 42 fixed. In a conventional conveyor, however, the direction of belt travel, for all practical purposes, remains constant due to the great length of the belt, and it is more feasible to free up the return roller assembly than to provide means for swinging the belt.

As a result of the movement of the return roller assembly into the position of FIGURE 5, the net training effect 92 is directed at an angle to the direction of belt travel 90 and the belt is urged back to a centered position. As the belt moves to a centered position, the angle formed between arrows 90, 92 will gradually decrease until they reach zero at the point at which the belt runs centered.

Instant movement of the return roller assembly in response to passage of the belt thereover in a detrained condition is provided by the double mechanical linkages connecting the anchor arms 60–63 to the ends of the return roller assembly box frame 46–48. Since the mechanical linkages are also pivoted about the junctions of the long and short link arms, extension and retraction of the linkages is possible without displacing the outer ends of the long link arms 68, 69. Similarly, for the same amount of angular displacement of the return roller assembly, as contrasted with a single link between the assembly and the anchor arms 60–63, the inward deflection of the illustrated linkage will be less, as is obvious from well known laws of mechanics.

By the addition of extra link arms, the effects described above can be multiplied, and such additions are within the scope of the invention but have not been illustrated for purposes of simplicity.

Although the return roller assembly has been illustrated as supported at its midpoint, this is not essential to operation if such an arrangement would not be feasible in any particular installation. It is really only essential that the point of support, if a bottom support is used, lie between the extremities of the roller. It would be possible, of course, to eliminate the bottom support entirely and suspend the return roller assembly from upwardly located supports, as illustrated in application Serial No. 772,106, assigned to the assignee of this application, and such a modification is within the scope of this invention. Whatever the mode of support of the return roller assembly, however, the principles of the multiple linkage are applicable.

In general, so long as the effective axis of rotation of the roller assembly (whether it be constantly or variably positioned for different angular positions of the return roller assembly), is located between the ends of the roller 42, for any extending movement of one linkage there will be a corresponding retracting movement of the other linkage. When the pivoting axis of the return roller assembly is located substantially at midpoint, as illustrated in FIGURES 4 and 5, the corresponding extending and retracting movements of the linkages will be equal. This particular embodiment is preferred over one in which the effective axis of rotation of the return roller assembly is displaced from the center because, the further the pivoting axis is displaced from the midpoint, the more closely the assembly approaches a single link arrangement.

Although a preferred embodiment of the invention has been illustrated and various modifications discussed, it will be understood that all modifications are intended to be illustrative only, and various modifications will occur to those skilled in the art upon a reading of this specification. Accordingly, the scope of the invention is intended to be limited only by the scope of the following claims.

I claim:

1. An automatic belt training roller assembly for a flexible belt conveyor, said assembly including, in combination, a roller, means for enabling the ends of the roller to swing to and fro in directions generally parallel to the direction of belt travel, and means for canting the roller into a belt training position in response to movement of the belt thereacross in a detrained condition, said canting means including a pair of linkages, each linkage being bodily expandable and contractable from end to end, one end of each linkage being operatively connected to the roller at positions flanking the mid-point of the roller, the other end of each linkage being operatively connected to a substantially stationary anchoring structure whereby angular movement of the roller about a generally vertical axis intermediate its ends causes an extending movement of one linkage and at least a partial, corresponding retracting movement of the other linkage, each linkage further carrying a belt guiding device located between the ends of the linkage and so positioned as to bear against the edge of a belt only during the normal running position and retracting movement of its associated linkage.

2. An automatic belt training return roller assembly for a flexible belt conveyor, said assembly including, in combination, a return roller, a return roller supporting structure including a substantially rigid frame which maintains the end of the roller a substantially fixed distance apart, said frame being pivotable about a fixed support intermediate the ends of the roller to thereby enable the ends of the roller to swing to and fro in directions generally parallel to the direction of belt travel, and means for canting the roller into a belt training position in response to movement of the belt thereacross in a detrained condition, said canting means including a pair of linkages, each linkage being bodily expandable and contractable from end to end, one end of each linkage being pivotally connected to the roller at positions flanking the midpoint of the roller, the other end of each linkage being pivotally connected to a substantially stationary anchoring structure whereby angular movement of the roller about its pivot point on the fixed support causes an extending movement of one linkage, and at least a partial, corresponding retracting movement of the other linkage, each linkage further carrying a belt guide roller located between the ends of the linkage so positioned as to bear against the edge of a belt only during the normal running position and retracting movement of its associated linkage.

3. The automatic belt training return roller assembly of claim 2 further characterized in that the linkage comprise two links pivoted at their point of intersection, said links being so disposed that the linkage end pivotally connected to the stationary anchoring structure is the furthest lateral extension of the linkage from the pivot point on the fixed support in all extended and retracted linkage positions.

4. The automatic belt training return roller assembly of claim 3 further characterized in that the guide rollers are located at the point of intersection of the individual links.

5. The automatic belt training roller assembly of claim 8 further characterized in that each linkage comprises two links pivoted at their point of intersection to one another.

References Cited in the file of this patent

UNITED STATES PATENTS

| | | |
|---|---|---|
| 1,815,099 | Foote | July 21, 1931 |

FOREIGN PATENTS

| | | |
|---|---|---|
| 599,474 | Germany | July 3, 1934 |
| 618,019 | Great Britain | Feb. 15, 1949 |